(12) United States Patent
Hasbun

(10) Patent No.: US 7,971,232 B2
(45) Date of Patent: Jun. 28, 2011

(54) SETTING GROUP POLICY BY DEVICE OWNERSHIP

(75) Inventor: Robert N. Hasbun, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 1054 days.

(21) Appl. No.: 11/554,330

(22) Filed: Oct. 30, 2006

(65) Prior Publication Data

US 2008/0104705 A1 May 1, 2008

(51) Int. Cl.
*G06F 7/04* (2006.01)
*G06F 1/26* (2006.01)
*H04L 29/06* (2006.01)
*H04N 7/173* (2006.01)
*H04N 7/167* (2006.01)

(52) U.S. Cl. .......... 726/2; 726/27; 726/34; 713/155; 725/117; 380/232

(58) Field of Classification Search .......... 713/182, 713/155; 726/26, 27, 2, 34; 380/241, 232; 725/117
See application file for complete search history.

(56) References Cited

U.S. PATENT DOCUMENTS

| | | | |
|---|---|---|---|
| 5,991,877 A | 11/1999 | Luckenbaugh | |
| 6,408,326 B1 | 6/2002 | Larsson et al. | |
| 6,466,932 B1 * | 10/2002 | Dennis et al. | 710/33 |
| 6,532,535 B1 * | 3/2003 | Maffezzoni et al. | 713/1 |
| 6,535,977 B1 * | 3/2003 | Holle et al. | 713/2 |
| 7,196,610 B2 * | 3/2007 | Straumann et al. | 340/5.61 |
| 7,330,966 B2 * | 2/2008 | Ice et al. | 713/2 |
| 2003/0115246 A1 * | 6/2003 | Mahon et al. | 709/200 |
| 2004/0162786 A1 | 8/2004 | Cross et al. | |
| 2006/0047859 A1 | 3/2006 | Cavalaris et al. | |
| 2006/0080526 A1 * | 4/2006 | Kasahara et al. | 713/155 |
| 2007/0053306 A1 * | 3/2007 | Stevens | 370/252 |
| 2007/0060103 A1 * | 3/2007 | Patterson et al. | 455/410 |
| 2007/0079381 A1 * | 4/2007 | Hartung et al. | 726/26 |
| 2007/0157313 A1 * | 7/2007 | Denton | 726/22 |
| 2007/0169071 A1 | 7/2007 | Martin et al. | |
| 2007/0244897 A1 * | 10/2007 | Voskuil et al. | 707/9 |
| 2008/0070495 A1 * | 3/2008 | Stricklen et al. | 455/3.01 |
| 2008/0104705 A1 | 5/2008 | Hasbun | |

OTHER PUBLICATIONS

Tulloch, Mitch, "Disabling USB Storage with Group Policy," Nov. 2005; downloaded from URL: <http://windowsdevcenter.com/lpt/a/6329>, Mar. 5, 2010; 3 pages.

Posey, Brien M., "Windows Longhorn: Using Group Policy to Control Device Management (Part 1)," Aug. 2006; downloaded from URL: <http://www.windowsnetworking.com/articles_tutorials/Windows-Longhorn-Using-Group-Policy-Control-Device-Management-Part 1.html?printversion>, Mar. 5, 2010; 7 pages.

Posey, Brien M., "Windows Longhorn: Using Group Policy to Control Device Management (Part 2)," Aug. 2006; downloaded from URL: < http://www.windowsnetworking.com/articles_tutorials/Windows-Longhorn-Using-Group-Policy-Control-Device-Management-Part2.html?printversion>, Mar. 5, 2010; 5 pages.

(Continued)

*Primary Examiner* — Nasser Moazzami
*Assistant Examiner* — Mohammad W Reza
(74) *Attorney, Agent, or Firm* — Merchant Gould P.C.

(57) ABSTRACT

A system is disclosed for centralized management of access permissions to specific devices on client terminals using a group policy framework. The system identifies a unique device identifier for a specific device, and allows policy to be set for the specific device based on identifying the specific device by its unique device identifier.

5 Claims, 13 Drawing Sheets

OTHER PUBLICATIONS

O'Brien, Gerry, "Extend Group Policy Further," Jun. 2005; downloaded from URL: <http://rcpmag.com/articles/2005/06/01/extend-group-policy-further.aspx?p=1>, Mar. 5, 2010; 5 pages.

MicrosoftTechNet, "Group Policy Collection" (updated Mar. 28, 2003); Microsoft Tech Net, downloaded from URL: < http://technet.microsoft.com/en-us/library/cc779838(WS.10,printer).aspx>, Mar. 10, 2010; 8 pages.

DeviceWall (Centennial Software), "Managing the Threat of Portable Storage Devices," DeviceWall product publication, May 2005; downloaded from URL: <http://web.archive.org/web/20050527020602/http://www.ensignuk.com/centennial_devicewall/DW-brochure.pdf>, Mar. 5, 2010; 10 pages.

Sharp Ideas, "Review of DeviceWall—an application for reducing risk of data theft," Jan. 20, 2006; downloaded from URL: <http://sharp-ideas.net/ideas/2006/01/20/review-of-devicewall-an-application-for-reducing-risk-of-data-theft.pdf>; Sep. 23, 2010; 7 pages.

Buike, Rodney, "The Lazy Admin, Creating Custom ADM Templates," Jul. 2005; downloaded from URL: <http://thelazyadmin.com/blogs/thelazyadmin/archive/2005/07/05/Creating-Custom-ADM-Templates.aspx>, Mar. 15, 2010; 6 pages.

Moskowitz, Jeremy, "Group Policy, Profiles and IntelliMirror for Windows® 2003, Windows® XP, and Windows® 2000 (Mark Minasi Windows Administrator Library)", ISBN: 0-781-4298-2, Sybex, Apr. 4, ISBN: 0782142982; 35 pages.

Swyx (Swyx Knowledgebase), HOWTO: Distribution of Swxlt! Via Group Policies of Active Directory (kb21970), Nov. 2005; 5 pages.

"Safend Endpoint Security," downloaded from URL: http://www.safend.com/11-en/Safend.aspx, Jan. 11, 2011; 2 pages.

"Endpoint Security Safend: Digital Membrane Technology," (archive search from Sep. 2006) downloaded from URL: http://web.archive.org/web/20060819065016/http://www.safened.com/37-en/Safend.aspx, Jan. 11, 2011; 1 page.

"Endpoint Security Safend: USB Port Protector," (archive search from Sep. 2006) downloaded from URL: http://web.archive.org/web/20060813213926/http://www.safend.com/66-en/USB%20Port%20Protector.aspx>, Jan. 11, 2001; 1 page.

"Securewave," (archive search from Sep. 2006), downloaded from URL: http://web.archive.org/web/20060907215529/http://www.securewave.com/home.jsp>, Jan. 11, 2011; 2 pages.

"USB Security—USB Endpoint Security, Port Protection and Control of All Removable Devices," (archive search from Sep. 2006), downloaded from URL: http://web.archive.org/web/20061016205842/http://www.securewave.com/sanctuary_usb_endpoint_security_software.jsp>, Jan. 11, 2001; 2 pages.

USPTO Non-Final Office Action dated Mar. 16, 2010, in U.S. Appl. No. 11/554,284; 16 pages.

Amendment and Response to Non-Final Office Action filed Jul. 16, 2010 in U.S. Appl. No. 11/554,284; 19 pages.

USPTO Final Office Action dated Sep. 28, 2010, in U.S. Appl. No. 11/554,284; 12 pages.

Amendment and Response to Final Office Action filed Dec. 28, 2010 in U.S. Appl. No. 11/554,284; 13 pages.

* cited by examiner

SETTING GROUP POLICY BY DEVICE OWNERSHIP

CROSS REFERENCE TO RELATED APPLICATION

The present application is related to U.S. patent application Ser. No. 11/554,284, entitled, "Group Policy for Unique Class Identifier Devices," by E. Hill, et al., which application is filed concurrently herewith, and which application is incorporated by reference herein in its entirety.

BACKGROUND

Removable storage devices such as USB Flash Disks (UFD), Secure Digital (SD) disks, and the like are small form factor devices that are easily portable and can have significant storage capacity. While their portability and large storage capacity provide significant advantages to users for transferring data, these same attributes present a significant security challenge for companies, laboratories and other organizations. The small size, large storage capacity and ease of use of such devices could allow unsupervised visitors or unscrupulous employees to smuggle confidential data out of an organization with little chance of detection. Moreover, computer systems are vulnerable to attack by malicious software introduced into the system from removable devices.

In view of these concerns, despite the clear advantages provided by removable storage devices, many organizations are taking steps to prevent their usage. Some organizations forbid all manner of removable storage device usage. Some organizations configure computers, one at a time, to disconnect or otherwise disable the ports within which removable storage devices are received. Other organizations have gone so far as to plug the removable storage device ports with epoxy or the like.

It would be advantageous for IT administrators to be able to control the use of and access by removable storage devices on a network-wide basis. At present, Window® based operating systems employ a group policy framework. Group policy is an infrastructure where one or more desired configurations or policy settings may be set at a single domain controller and then applied to one or more groups of users and/or computers across a network. Group policy employs a collection of settings, referred to as group policy objects ("GPO"), that define what one or more client computers will look like and how it will behave for one or more defined group of users. In addition to allowing disparate privileges to different user groups, group policy also allows software installations, updates and changes to be applied across an entire network of computers via a simple change to an existing GPO. This reduces the administrative burden and costs associated with managing these resources.

Group policy is currently used to manage and control software features available on a given computer or available to a given user. A wide variety of software attributes and functions may be controlled via group policy including security policy, scripts for logon/logoff, start up and shut down, and Internet Explorer settings. Removable storage devices have not conventionally been controlled through group policy. While it is known to be able to inhibit the operation of a class of removable storage devices, such as for example disabling the CD/DVD drives through the I/O manager in the Windows® operating system, no system is known to the inventor for selectively applying access rights to each device on a given client computer.

By the same token, the installation of unique class identifier devices, removable or otherwise, presents similar security risks. A unique class identifier device is a generic term for a device which identifies itself as belonging to a set of devices with specific functionality, where the unique class identifier may not already be known to the operating system. A custom GUID (global unique identifier) is one example of a unique class identifier. When a vendor develops a previously unknown device for use on or with a Windows® operating system computing device, the vendor generates a unique class identifier for that device. The Windows® operating system includes a tool—guidgen.exe—for generating unique class identifiers for new devices. Over time, as the device becomes more common, the unique class identifier may be identified to the Windows® operating system (either as a snap-in to an existing version, or written into a new version). At that time, the GUID device class for that device becomes known, or standard. As one example, Windows Portable Devices ("WPDs"), including portable media players, digital still cameras and mobile phones were assigned a unique class identifier in older versions of the Windows® operating system. However, in Windows Vista™ operating system, WPDs have been identified to the operating system and now WPDs are considered a standard device class.

Once the device class for a device is known, group policy may be set for that device. However, conventionally, there are no mechanisms for setting group policy for unique class identifier devices. Consequently, until a device class GUID is identified to the operating system and becomes known, there is no way to restrict usage of or access to such devices using group policy.

SUMMARY

The present technology, roughly described, relates to a system allowing IT administrators to control network-wide access rights to unique class identifier devices and/or removable storage devices using the group policy framework. A first aspect of the present system relates to a user interface on a control server for IT administrators or others to enter group policies to be applied to client terminals and user groups network-wide for unique class identifier and/or removable storage devices. A second aspect of the present system relates the components on the client terminals that will act upon and implement the access permission settings received from the control server.

Access rights to devices may be set on a control server by defining group policy objects for removable storage devices. The group policy objects for unique class identifier and removable storage devices may be defined via text-based administrative templates, for example in an ADM file format. The administrative template files for the present system specify the registry locations of different devices on the client terminals, as well as the options for setting access rights to the devices on the client terminals. The administrative templates also include instructions for configuring a user interface so as to provide an IT administrator with the ability to select removable storage devices and set the access rights to those devices. The interface may also provide the administrator the ability to enter a unique class identifier and then set group policy for the associated device.

A second aspect of the present system relates to the components on the client terminals that act upon and implement the device access permissions received from the control server. Group policy for a device on a client terminal may be applied or updated in at least two scenarios. A first scenario is during installation of a device on a client terminal. A second scenario is after installation of a device, where group policy settings that apply to that device are changed at the control server.

When a device is being installed on a client terminal, an installation engine such as a co-installer may check whether the device is a unique class identifier or removable storage device. If it is, the co-installer may retrieve the current group policy for the device. Based on the retrieved group policy, the co-installer may also create and store a security descriptor, including an access control list which contains the access permissions for use of the installed device.

Another scenario where access permissions for a device may be implemented is when a change occurs in the group policy settings that apply to that device. In order to handle this possibility, the client terminals may each include a service, referred to a group policy service, which runs on the client terminals to monitor changes in group policy settings.

When a change in group policy is made, the group policy service examines the new policy to see if it is applicable to one or more devices on its client terminal. If it is, the group policy service may apply the new group policy access permissions to the one or more devices. The group policy service may also restart the one or more devices so that the new access rights may be applied right away.

The group policy for unique class identifier and removable storage devices will govern requests by a client terminal I/O manager for access to the devices on a client terminal. Thus, for each class of device, the access rights a user will have may be specified by the group policy for the devices.

In a further aspect of the present system, permissions and group policy may be set for a specific device (as opposed to specific type of device), client terminal and/or user. In such embodiments, a unique identifier for each device may be identified and, in embodiments, associated with a specific user or team of users. Thereafter, the device owner may have permission to use that device on one or more client terminals, while others may be restricted from using that device on the one or more client terminals.

DETAILED DESCRIPTION

The present system is explained hereinafter with reference to FIGS. 1 through 13, which in general relate to a system for centralized management of access permissions to unique class identifier devices and/or removable storage devices on client terminals within a network. In embodiments, the present system may be implemented in a Windows® operating system environment using the Windows® operating system group policy framework. However, it is contemplated that the present system may be implemented on other operating systems employing centralized management of policies and permissions applied to client terminals and/or user groups.

As used herein, removable storage devices include all components capable of storing data and which are capable of operation with, and removal from, a computing system environment. Such devices include USB flash disks and USB disk and floppy drives, secure digital disks and other flash memory devices built according to other standards. Such devices further include tape drives, CD and DVD drives, and floppy drives. Such devices further include WPDs and media such as CDs, DVDs and floppy disks. It is understood that the above is not an exhaustive listing of what may be considered a removable storage device, and other devices and media are contemplated.

Figure 1:
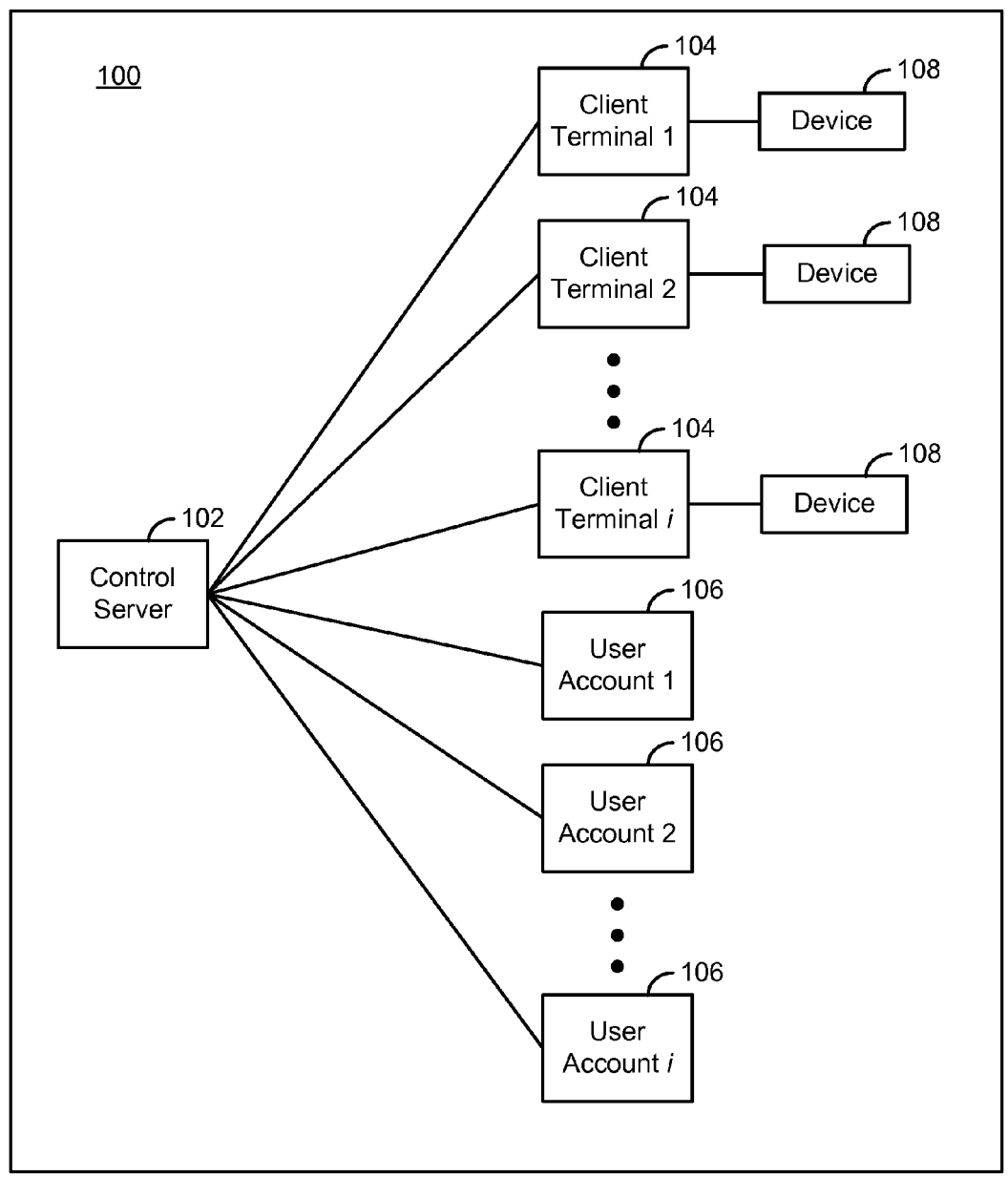
FIG. 1 is a block diagram of a network including a control server, a plurality of client terminals and a plurality of defined user groups.
Figure 2:
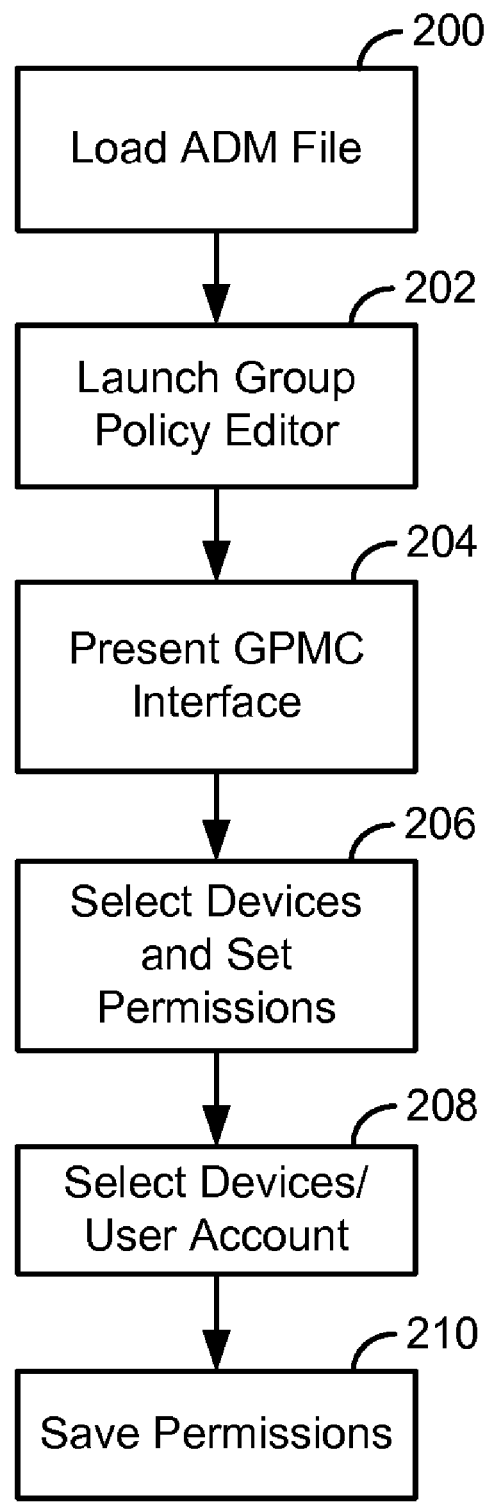
FIG. 2 is a flow chart showing the steps for generating group policy for unique class identifier devices and removable storage devices.

Referring now to FIG. 1, there is shown a network 100 including a control server 102 for administering group policy for a plurality of client terminals 104 and user accounts 106. Server 102 may include one or more databases for storing data relating to client terminals 104 and user groups 106, as well as a directory service application program for organizing the data relating to client terminals 104 and user groups 106. In embodiments using the Windows® operating system, control server 102 may be a domain control server. In embodiments, the control server 102 may also be a client terminal 104 on which policy may be set as explained hereinafter for client terminals 104.

Client terminals 104 may be any of a variety of computing device environments, including for example a desktop personal computer, a laptop, a handheld computer, a personal digital assistant (PDA), a cellular telephone, multiprocessor systems, microprocessor-based systems, programmable consumer electronics, minicomputers, distributed computing environments that include any of the above systems or devices, and the like. Details relating to one embodiment of control server 102 and client terminals 104 are explained hereinafter with respect to FIG. 9.

At least one of client terminals 104 may include one or more devices 108. Although one such device 108 is shown associated with a client terminal 104 in FIG. 1, a client terminal 104 may have no associated device 108, or more than one associated device 108. A device 108 may be a unique class identifier device and/or a removable storage device as described above (it is understood also that a device 108 may be both a unique class identifier device and a removable storage device). The user accounts may be divided up into a plurality of user groups, each group possibly having different group policy. While not critical to the present system, the user groups may include local system administrators, normal users, backup operators, power users, etc. It is further understood that a group policy may apply to a group as small as one person. The present system may be applied to client terminals 104 and user groups 106 within a domain or any of a variety of organizational units within a domain in network 100.

A first aspect of the present system relates to a user interface on a control server 102 for IT administrators or others to enter the policies to be applied to client terminals and user groups network wide for unique class identifier and removable storage devices 108, including the ability to generate and apply group policy to unique class identifier devices. As used herein, a unique class identifier device is any device for which a unique class identifier was generated and assigned by the device vendor, manufacturer or other. Typically, unique class identifiers will be created for a device when that device is not part of a standard device class known to the operating system. However, it is possible that a device could be within a standard device class, but for some reason, the vendor or other assigned a unique class identifier to the device. It is understood that what is a standard device class on one version of an operating system may not be a standard device class on another version of an operating system. A second aspect of the present system relates the components on the client terminals 104 that will act upon the settings received from the control server. Each of these aspects is explained in greater detail hereinafter.

Referring now to a first aspect of the present system, access rights to unique class identifier devices and/or removable storage devices may be set on control server 102 by defining new group policy objects (GPOs) for the devices. The group policy objects for both unique class identifier devices and removable storage devices may be defined via text-based administrative templates, for example in an ADM file format. This file will provide a user interface defining the various policies that can be set for removable storage devices. In alternative embodiments, the XML-based policy definition file format known as ADMX may be used instead of or in addition to the ADM file format.

The administrative template files for the present system specify the registry locations of different removable devices on the client terminals, as well as the options for setting access rights to the removable storage devices on the client terminals. As explained hereinafter, the options for configuring the unique class identifier and removable storage devices 108 may include allowing read and write operations, read only operations, write only operations or denying access altogether for the removable storage devices. The administrative templates also include instructions for configuring a user interface so as to provide an IT administrator with the ability to select removable storage devices and set the access rights to those devices. The user interface is referred to a group policy management console ("GPMC") in a Windows® operating system. The administrative templates specify what categories and subcategories should appear in the GPMC, and how policy options are displayed on the GPMC. The GPMC translates the template files into a user friendly format through which an administrator may set group policy for removable storage devices.

Figure 3:
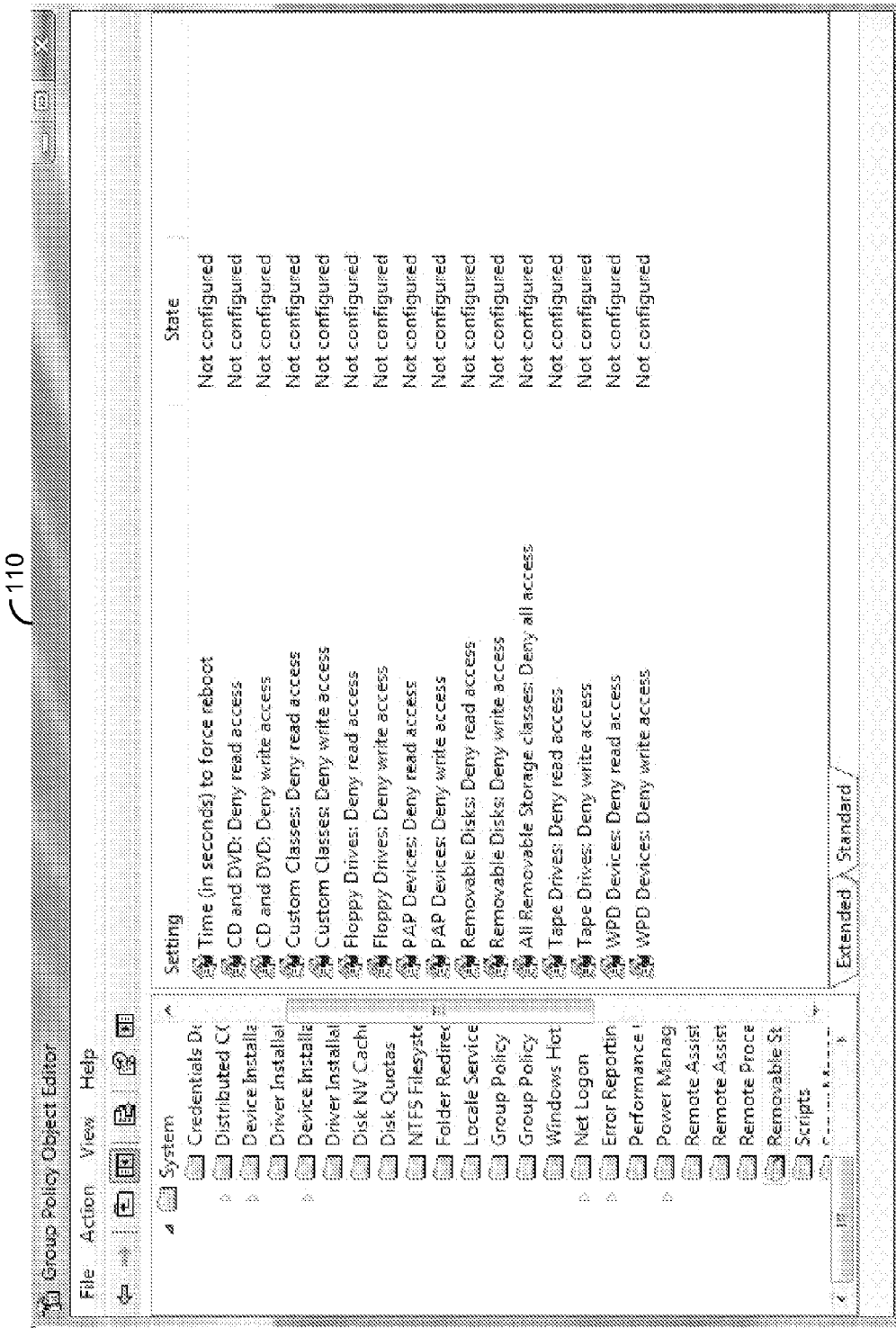
FIGS. 3 through 5 are illustrations of a user interface for generating group policy for removable storage devices.
Figure 4:
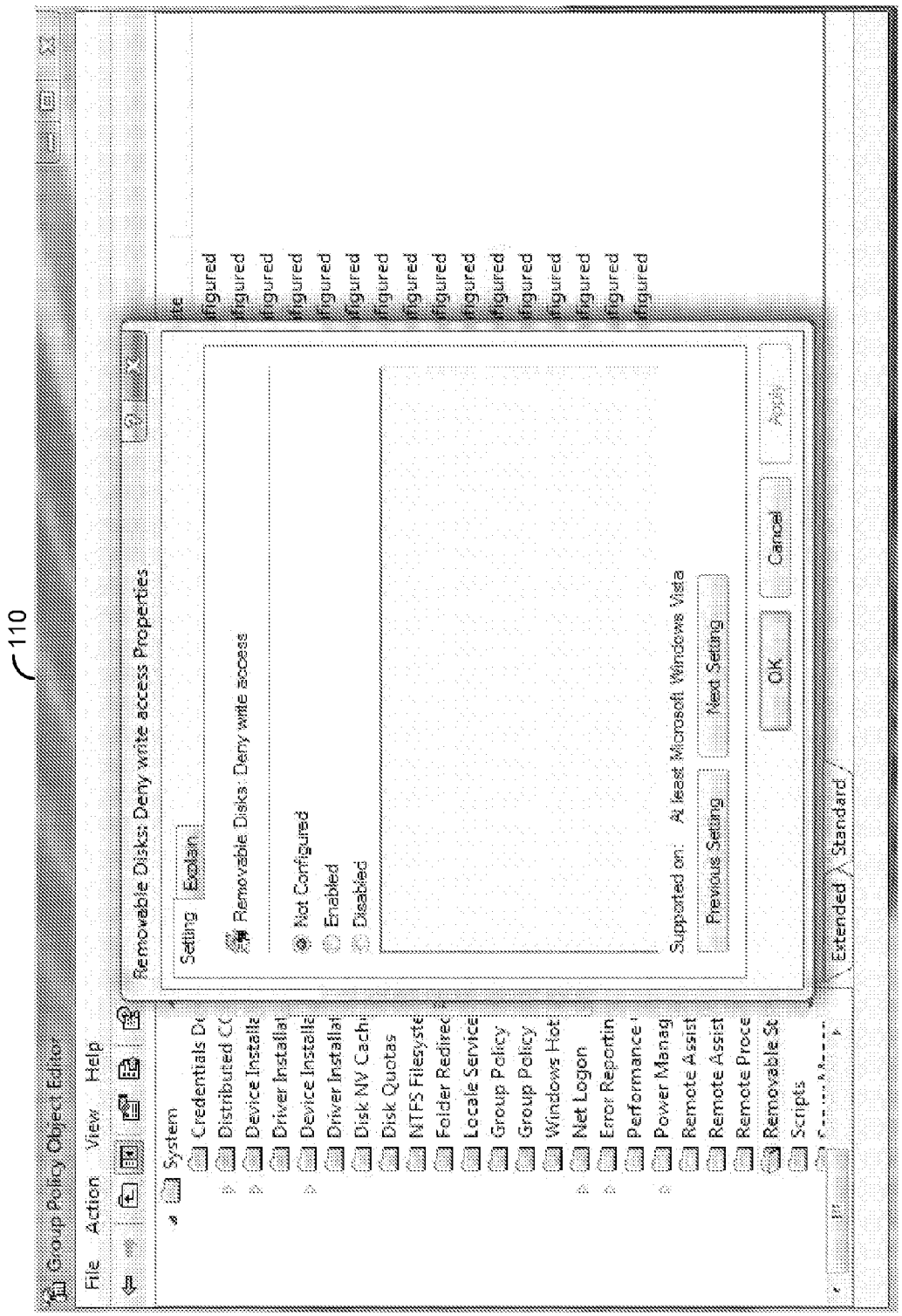
Figure 5:
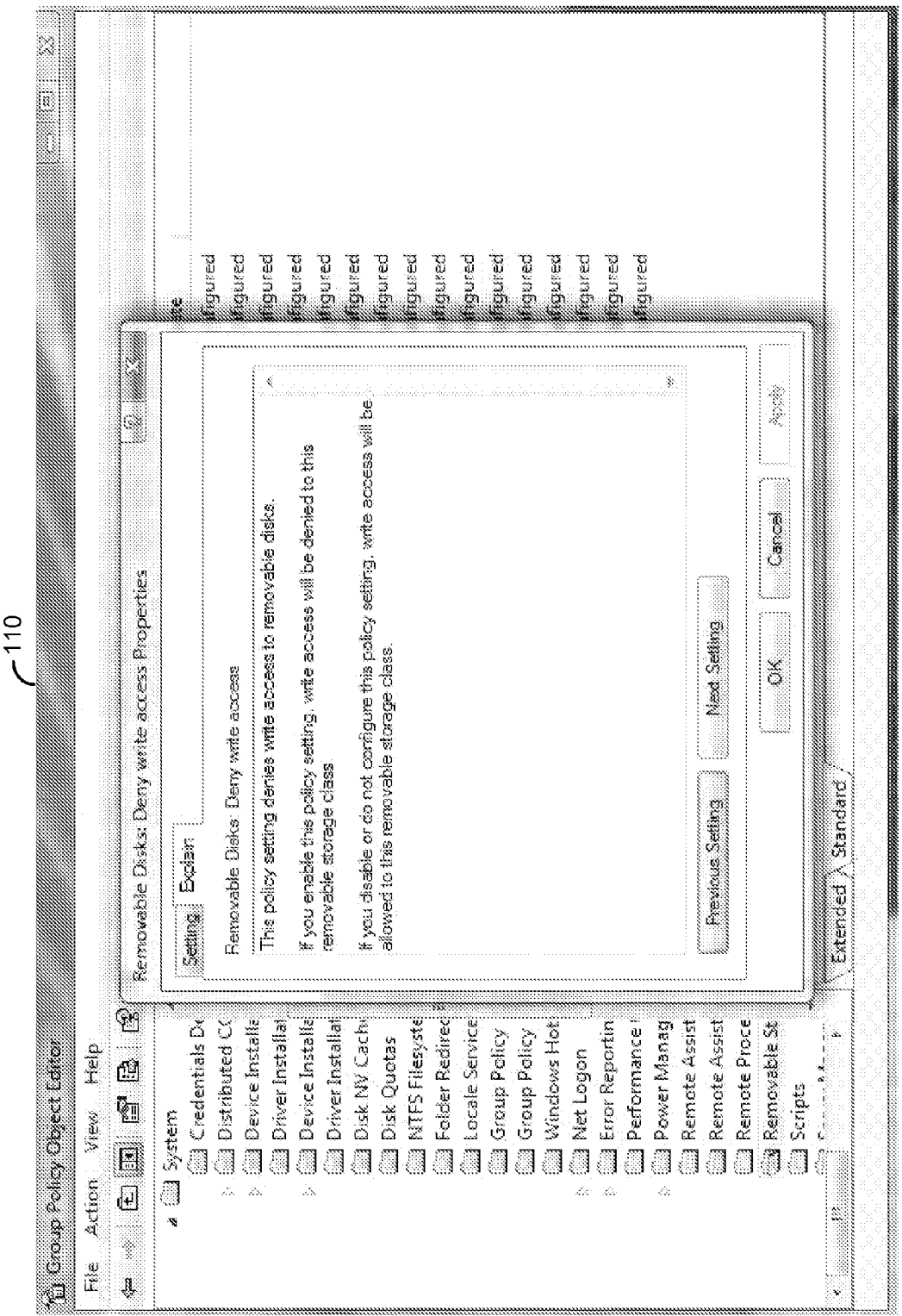

An example of GPMC using templates for removable storage devices is shown in FIGS. 3 through 5. Referring to those figures and the flow chart of FIG. 2, an administrative template specifying the registry settings for removable storage devices may be loaded in step 200. A group policy editor on control server 102 may be launched in step 202, and the operating system may then present GPMC in step 204. The IT administrator or other may provide instructions via the user interface 110 shown in FIG. 3 to set the group policy for unique class identifier devices and/or removable storage devices. User interface 110 may include a console tree of GPOs, and options for setting group policy access permissions for the GPOs. User interface 110 may also include an option 111 in the console tree for creating a GPO for a unique class identifier device as explained hereinafter.

Upon selecting the object for removable storage devices (as in FIG. 3), the interface 110 may present the various removable storage devices and the group policy options for each device. For example, for removable storage devices, interface 110 may present the IT administrator the option to set a time period for a forced reboot of a client terminal upon changing a group policy affecting that client terminal. The interface 110 may also present the IT administrator the option to set read and write access for the different removable storage devices (e.g., CD and DVD drives, custom classes of removable drives, floppy disk drives, plug and play devices, removable disks in general, tape drives, and WPD devices). The devices shown are by way of example only and it is understood that other removable devices may be included on interface 110 in addition to or instead of those shown.

As written in the administrative template file, the default setting for each removable device may be to allow read/write operations to all removable storage devices. It is understood that the default may be otherwise in alternative embodiments. As shown in FIG. 4, an IT administrator may set policy for any of the listed devices by selecting it, at which point interface 110 presents a window allowing the administrator to set permissions for that device (step 206). For example, in FIG. 4, the administrator has selected the option to set Write permissions for all removable storage devices. By enabling this option, the state (e.g., DENY_WRITE) may be set to 1, and all write operations to removable storage devices would be denied. If the access is enabled or it is not configured, the user is allowed access. The administrative template may also provide for a textual description to be displayed on interface 110 which explains each option, as shown for example in FIG. 5.

Using interface 110, an IT administrator or other can therefore set a group policy to allow or deny read and/or write access permissions for all removable storage devices. As explained in greater detail hereinafter, a group policy for removable storage devices may be applied on a machine level and/or user level. Although not shown on interface 110, an IT administrator may also be presented with the option to select a group of one or more client terminals 104 to which the set access permissions are to apply, and/or one or more user accounts 106 to which the set access permissions are to apply (step 208). When the policy settings are saved (step 210), GPOs will be created and stored on the control server 102.

The administrative template for removable storage devices may be included as part of the operating system that is installed onto the control server 102. Alternatively, the administrative template for removable storage devices may be added as a snap in after the operating system has been installed on control server 102.

Figure 6:
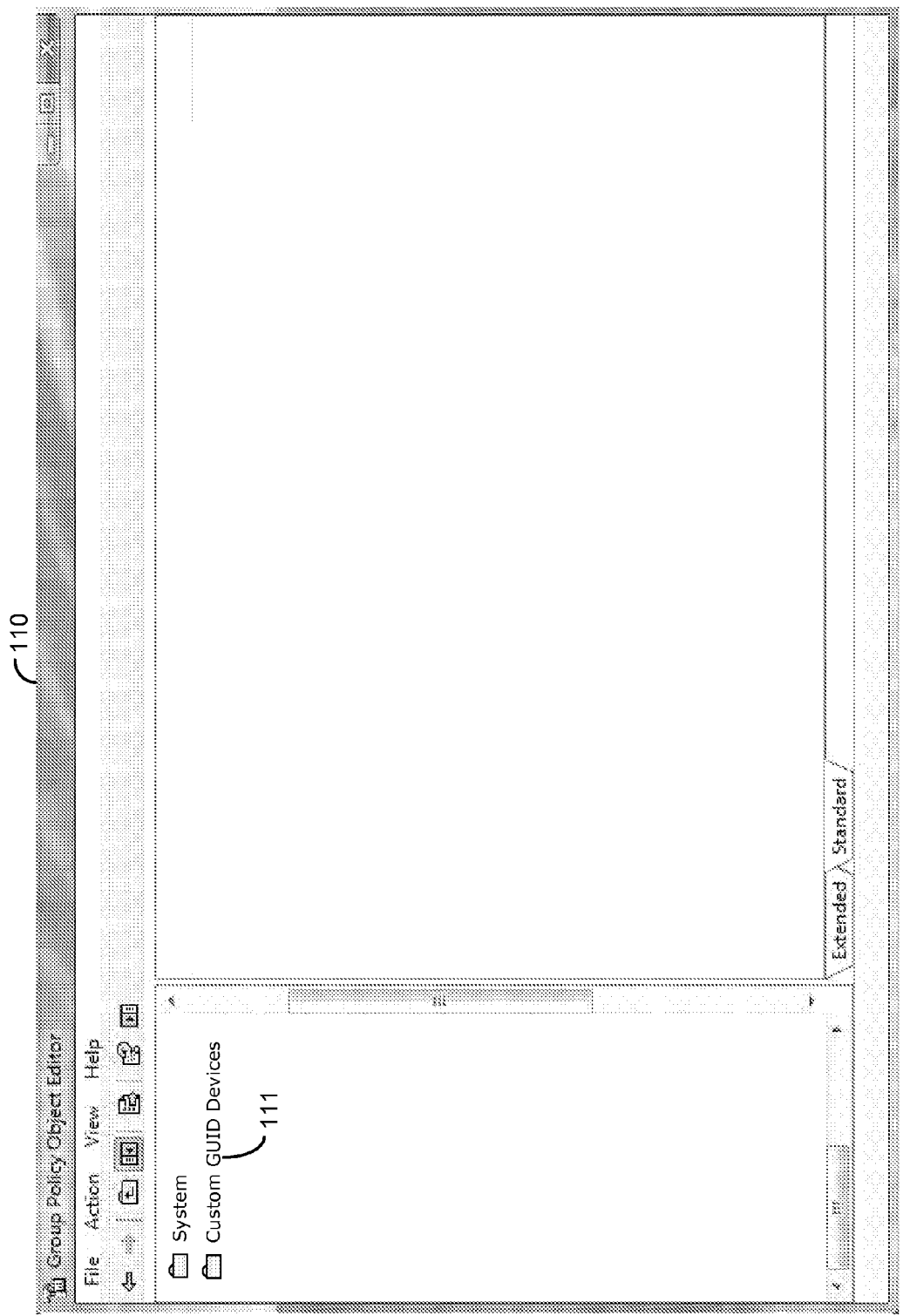
FIGS. 6 through 7 are illustrations of a user interface for generating group policy for unique class identifier devices.

An administrative template for unique class identifiers may also be included as part of the operating system when installed, or the template may be added to the operating system after installation as a snap in. The administrative template for unique class identifiers is configured to present a user interface to administrators allowing the administrators to set group policy for unique class identifiers. In particular, as shown in FIG. 6, the user interface 110 may include an option 111 for creating group policy for a unique class identifier device. Upon selecting option 111, a user may be presented with a user interface 113 as shown for example in FIG. 7. The user interface 113 may be similar to the user interface as shown for example in FIG. 4 for setting group policy for a known device class, except that in user interface 113, the administrator would also be provided a text box 115 for the administrator to manually enter the unique class identifier that was generated for that device by the device vendor or manufacturer (the unique class identifier shown in box 115 is by way of example only). The unique class identifier may be a custom GUID or other identifier. The administrator may be supplied the unique class identifier from the unique class identifier device vendor or manufacturer, the device driver provider or from some other source.

Figure 7:
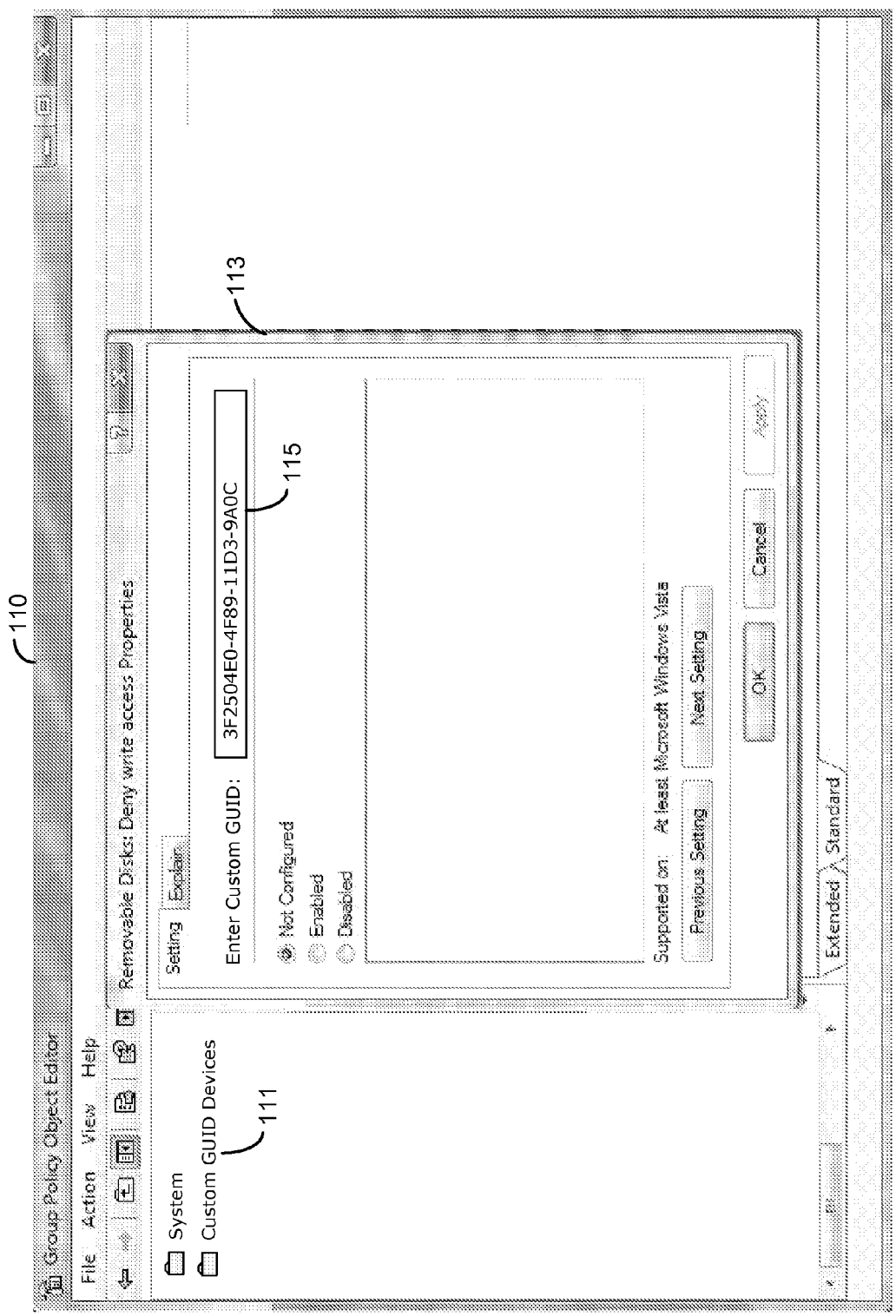
Figure 8:
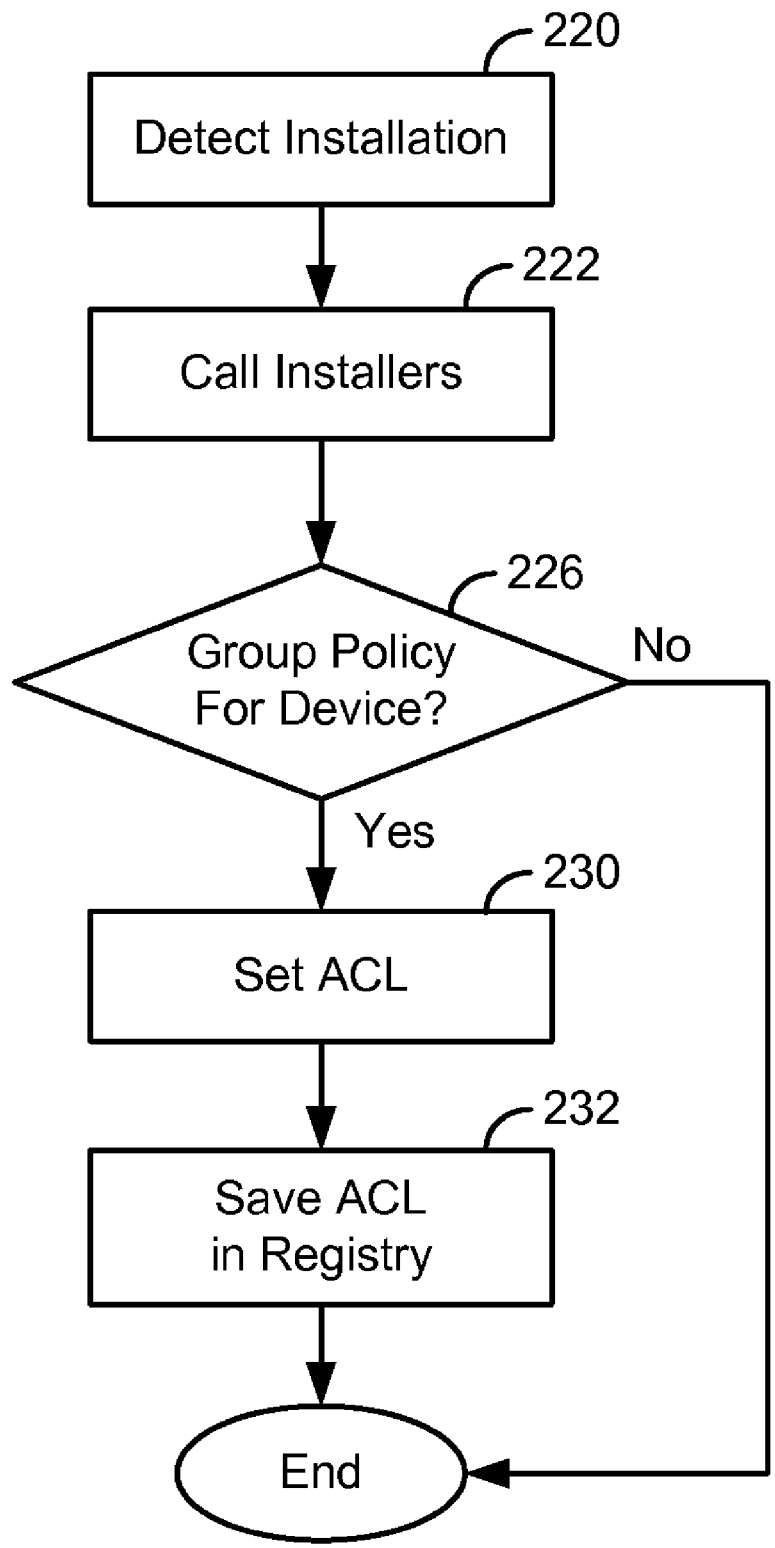
FIG. 8 is a flowchart for applying group policy to a newly installed unique class identifier device and removable storage device.

As shown in FIG. 7, the user may enter the custom device GUID, and then specify policy for the device as described above. Once the process is completed, the administrator may save the group policy for the unique class identifier device in a unique class identifier GPO. The unique class identifier GPO specifies the device class for which policy is set and the permissions granted (including access rights and whether the policy is a machine-based policy and/or user-based policy). As explained hereinafter, by designating a unique class identifier in user interface 113, and then associating permissions with that unique class identifier, the permissions may be applied in a group policy to all unique class identifier devices on the network having that unique class identifier.

A second aspect of the present system relates to the components on the client terminals 104 that act upon the access permissions received from the control server 102. Group policy on a client terminal 104 may be applied or updated in at least two scenarios. A first scenario is during installation of a unique class identifier device or removable storage device on a client terminal. A second scenario is where a unique class identifier device or removable storage device is installed, but group policy settings that apply to those devices are changed at the control server 102. Each of these scenarios is explained hereinafter in greater detail.

A challenge around group policy is that the enforcement is usually done at the client terminal. For intelligent devices (that have local storage) such as the newer generation of UFD, authentication of the user's access rights based on the administrator-set group policy could be done directly between the device and the server via a key-based information exchange. In such an implementation the device would protect its data and usage instead relying on the client terminal to regulate access and usage.

With respect to the first scenario referred to above, when a unique class identifier device or removable storage device 108 is being installed on a client terminal 104, an installation engine such as a co-installer may check whether the device is a unique class identifier device or removable storage device. If it is, the co-installer may retrieve the current group policy for the device 108. Based on the retrieved group policy, the co-installer (or some other security code, driver or manager) may also create and store a security descriptor, including an access control list, or ACL, which contains the access permissions for use of the installed device. These steps are explained in greater detail below with respect to FIG. 8.

In the Windows® operating system, the Plug and Play (PnP) manager may handle device installation. When a device is attached to the device client 104, the PnP manager for the client terminal detects the installation in step 220, examines the device and installs drivers for the device if it is able. During the device install, the PnP manager also calls the class installer and class co-installer that are registered for the class of the device being installed (step 222). These components are responsible for handling any special processing that is required for installing the device. In a Windows® operating system embodiment, SysClass.dll may be the class co-installer for installation of the disk, CD\DVD, tape, and floppy class of devices. In a Windows® operating system embodiment, WPD_CI.DLL may be the class co-installer for the WPD class of devices. Other co-installers are contemplated.

In step 226, the co-installer may check the device drivers to determine whether the attached device's class GUID (whether previously known or not) has a group policy setting prepared for it. In particular, whenever group policy for a unique class identifier or removable storage device is added or updated in control server 102, the group policy framework will propagate data relating to the update to the windows registry of the networked client terminals. When a unique class identifier or removable storage device is installed, the co-installer will check the relevant registry keys on the client terminal to see if there is a policy applicable for the device being installed.

If it is determined in step 226 that there is no group policy set for the device the installation may be completed as is known in the art. If such a group policy exists, the co-installer may set a security descriptor in step 230 for the device being installed, including an ACL that matches the group policy. The ACL may be saved in the device client registry in step 232 so that the next time the system is rebooted or the unique class identifier/removable storage device is restarted, the same ACL will be applied on the device. Since the class co-installer will be called with SYSTEM privilege, it will be able to access the registry keys for the device. It is understood that the ACL may be stored in a unique file not within the device client registry, where it may be signed and easily measured. If no group policy is found in step 228, the PnP manager may assign a default ACL and complete the installation as is known in the art.

The ACL matching the group policy for the unique class identifier/removable storage device being installed may be generated and stored before the device installation is completed. In this way, when the device is started, the stored ACL conforming to the current group policy will be applied on the device. This ACL is subsequently used by the client terminal I/O manager during a device open request as explained hereinafter. Though less preferable, it is understood that the ACL matching the group policy may not be stored until after the device installation is completed.

It may happen that an ACL will get changed after the above-described steps of setting the ACL to the group policy, but before installation of the device is completed. Therefore, in embodiments, the co-installer may check if the ACL that was set as described above was altered at the end of the installation. If so, the co-installer may set it back to match the group policy for the installed device. A restart of the device may be necessary for re-alteration to take effect, as the device would have been started by the time the re-alteration is implemented. If restart attempt fails, a reboot of the client terminal may be performed.

A second scenario where a group policy may be applied or updated is after installation of a unique class identifier device or removable storage device, where a change occurs in the group policy settings that apply to that device. In order to handle this possibility, the client terminals 104 may include a service, referred to a group policy service, which runs on the client terminals 104 to monitor changes in group policy settings. When such a change happens, the group policy service examines the new policy to see if it is applicable to devices on its client terminal. If it is, the group policy service may apply the new group policy access permissions for unique class identifier or removable storage devices enumerated in the client terminal. The group policy service may use known setup APIs to update the new permissions. It may also restart the devices so that the new access rights may be applied right away. As changes in group policy may occur at any time, the group policy service may be running at all times on a client terminal.

In embodiments, the control server 102 may push changes to the group policy service on client terminals 104. That is, when a unique class identifier GPO or a removable storage device GPO is created or modified, the control server 102 may send out a notification to all registered client terminals 104, whereupon the group policy service may make the specified changes within the client terminal registry. A GPO may apply to a client terminal if that client terminal is specified in the GPO or if a user logged onto that client terminal is specified in the GPO.

In embodiments, the notification of new or changed group policy may alternatively or additionally be pulled from the control server 102. That is, the group policy service from a client terminal may periodically contact the control server 102 and look for a new or changed GPO that is targeted to that client terminal or user logged on to that client terminal. The periodic contact may occur once every 30 to 90 minutes, but it may be shorter or longer than that in alternative embodiments. A system of time stamps or the like may be stored with the GPOs so that the group policy service may determine when a GPO has been updated. Once a new or changed GPO is found, the group policy service may then pull that GPO (including settings and other related files) down to the client terminal.

As indicated above, during installation of a device 108, an ACL is created for that device that specifies the access rights client terminals, users or groups can have to that device 108. Upon modification of a group policy and generation of a new GPO, the ACL for targeted devices 108 may be changed to match the received updated GPO. This updated ACL is subsequently used by the client terminal I/O manager during a device open request as explained hereinafter.

Figure 9:
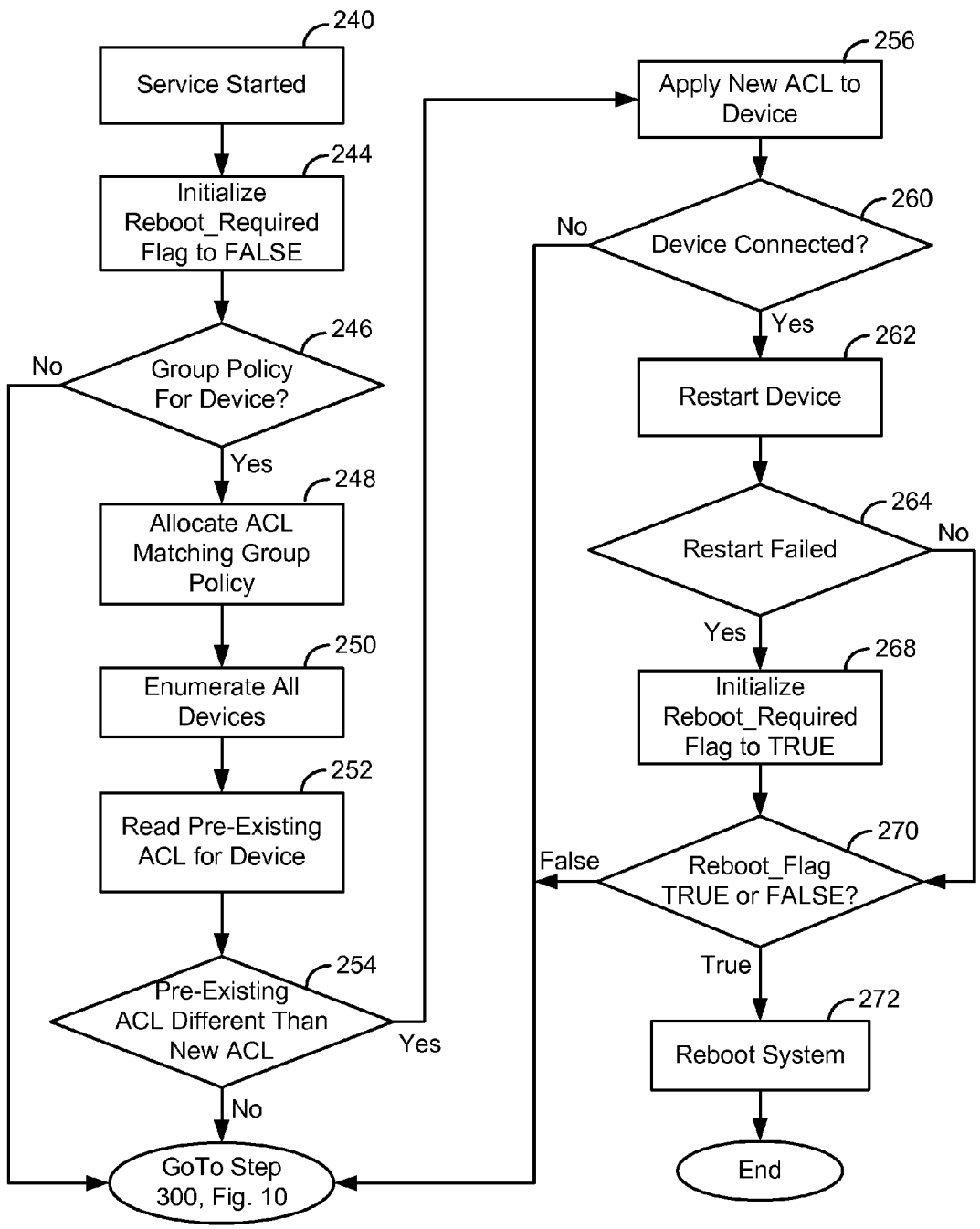
FIG. 9 is a flowchart for applying group policy via a group policy service running on a client terminal upon power-up of the client terminal and/or a user logging onto that client terminal.

FIG. 9 is a flowchart showing the steps which may occur upon start up of a group policy service on a client terminal. In embodiments, the group policy service may start up on power-up of a client terminal and/or upon logon of a user on a client terminal. In step 240, the operating system starts the group policy service on a client terminal 104. In step 244, a REBOOT_REQUIRED flag within the operating system, explained hereinafter, is set to FALSE. In step 246, the group policy service checks in the client terminal registry whether there is a group policy set for one or more of the devices 108 on the client terminal. If not, no further action is taken by the group policy service at that time with respect to implementing group policy for unique class identifier devices or removable storage devices, and the group policy service may then await a notification of group policy changes from the control server 102 (step 300, FIG. 10), explained hereinafter.

If, on the other hand, there is a group policy for a unique class identifier and/or removable storage device, a security descriptor including an ACL is allocated in step 248 that matches the GPO for those devices. ACLs are allocated as such to all devices for which a group policy is found. In step 250, the group policy service enumerates the devices that are installed on the system. Standard APIs exist for identifying devices in the enumeration step 250. In an embodiment, only those devices that are currently connected are enumerated. In an alternative embodiment, devices which are not currently connected, but which had previously been installed, may also be enumerated.

In step 252, for each device enumerated in step 250, the group policy service reads its pre-existing security descriptor, if any, that exists at that time for the devices 108. As indicated above, a default ACL may be assigned to a unique class identifier device or removable storage device upon installation where there is no group policy for that device. In step 254, if a pre-existing security descriptor is found for a device that has not been changed, no further action is taken by the group policy service at that time with respect to group policy for unique class identifier or removable storage devices, and the group policy service awaits a notification of change from the control server 102 (step 300, FIG. 10).

If, on the other hand, in step 254, no pre-existing security descriptor exists for a given device 108, or if the pre-existing security descriptor for the device 108 is different from the new security descriptor created in step 248, then the group policy service applies the new security descriptor for the device 108 in step 256 and replaces the pre-existing security descriptor with the new security descriptor.

In step 260, the group policy service may check if a given unique class identifier or removable storage device 108 is connected. If not, the group policy service may then branch to step 300, FIG. 10 of waiting for a notification of change from the control server 102. If, on the other hand, a given device 108 is connected in step 260, the device 108 may be restarted in step 262 so that the changes in group policy may take effect.

If a restart fails (step 264), then the REBOOT_REQUIRED flag may be set to TRUE (step 266). In step 270, the group policy service may check whether the REBOOT_FLAG is set to TRUE or FALSE. A false state means that the device restarted properly, and the group policy service may then branch to step 300, FIG. 10 of waiting for a notification of change from the control server 102.

In embodiments, if a device 108 did not restart properly (indicated by the REBOOT_FLAG being set to TRUE), a group policy may dictate that the system automatically reboot (step 272) after a preset period of time so that the group policy permission changes may take effect. In particular, as shown in FIG. 3, an IT administrator or other may be presented with the option of setting TIME TO FORCE REBOOT to a predetermined amount of time. If a time is set for this option, then a client terminal may automatically reboot after that time lapses in the event a device 108 fails to restart on a change in group policy. If no time is set for reboot, then steps 262 through 272 may be omitted, and the old group policy will still be applied.

Figure 10:
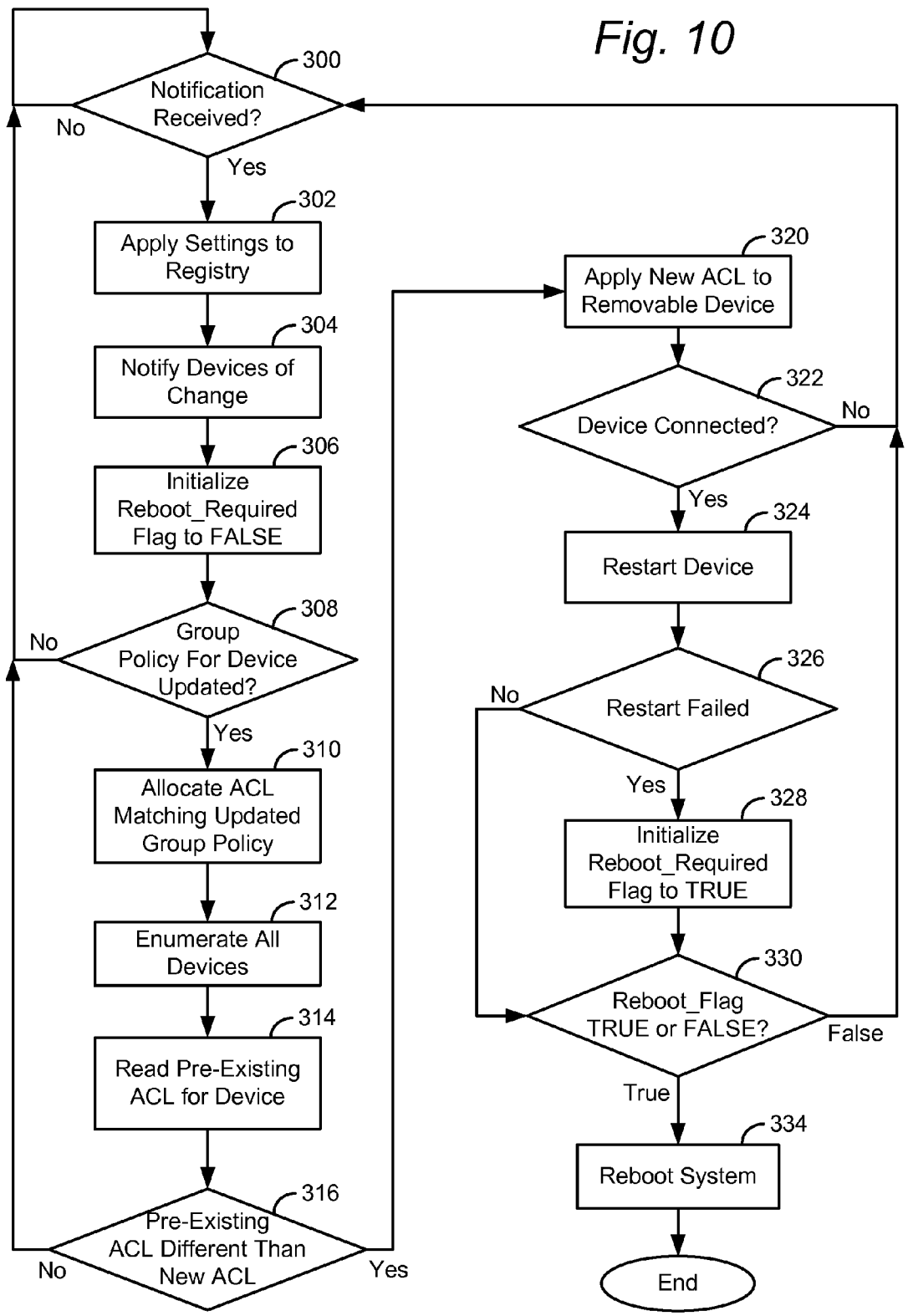
FIG. 10 is a flowchart for applying group policy via a group policy service running on a client terminal upon a change in group policy at the control server.

FIG. 10 shows the operation of the group policy service after it has been started. In step 300, the group policy service awaits for a notification from the control server 102 of a new or changed group policy. In the event of a new or changed group policy, the registry is updated by the group policy service in each client terminal affected by the change in step 302. In step 304, the group policy service client terminal sends notification of the change to the unique class identifier devices and removable storage devices (as well as other processes) on the client terminal. In embodiments, only the unique class identifier devices, removable storage devices and/or processes affected by the change receive the notification of the change from group policy service. In alternative embodiments, all devices 108 and/or processes on client terminal receive notification of the change, whether they are affected by the change or not.

In step 306, a REBOOT_REQUIRED flag within the operating system is set to false. In step 308, the group policy service checks in the client terminal registry whether there is an updated group policy set for a device 108 on the client terminal. If not, the group policy service returns to step 300 to await further notifications.

If, on the other hand, there a group policy update for one or more of the devices 108, a security descriptor including an ACL is allocated in step 310 that matches the GPOs for those one or more devices 108. In step 312, the group policy service enumerates devices 108 that are installed on the system. In an embodiment, devices which are not currently connected, but which had previously been installed, may be enumerated. In an alternative embodiment, only those devices that are currently connected are enumerated.

In step 314, for each device enumerated in step 312, the group policy service reads its pre-existing security descriptor, if any, that is currently set for the devices 108. In step 316, if a pre-existing security descriptor is found for a device that has not been changed, the group policy service returns to step 300 to await further notifications of change from the control server 102. If, on the other hand, in step 316, no pre-existing security descriptor is found for a given device 108, or if the pre-existing security descriptor on the device 108 is different from the new security descriptor created in step 248, then the group policy service applies the new security descriptor for the device in step 320 and replaces the pre-existing security descriptor with the new security descriptor.

In embodiments, an event log message may be generated when the security descriptor for the device is changed by the group policy service. An IT administrator can set the ACL such that an audit message is logged when access to the device fails due to insufficient access permission for the user. These features may be omitted in alternative embodiments.

In step 322, the group policy service may check if any unique class identifier or removable storage device 108 is connected. If not, the group policy service may return to step 300 to await further notifications of change from the control server 102. If, on the other hand, a given device 108 is connected in step 322, the device may be restarted in step 324 so that the changes in group policy may take effect.

If a restart fails (step 326), then the REBOOT_REQUIRED flag may be set to TRUE (step 328). In step 330, the group policy service may check whether the REBOOT_FLAG is set to TRUE or FALSE. A false state means that the device 108 restarted properly, and the group policy service may branch to step 300 to wait for a further notification of changes from the control server 102.

In embodiments, if a device did not restart properly (indicated by the REBOOT_FLAG being set to TRUE), a group policy may dictate that the system automatically reboot (step 334) after a preset period of time as explained above so that the group policy permission changes may take effect. If no time is set for reboot, then steps 326 through 334 may be omitted and the old group policy remain in effect.

In embodiments, it is desirable to have any changes in group policy be implemented quickly. For example, if a user had read and write access to a unique class identifier device 108, and the group policy is changed so that the user's group only has read access, it is desirable that write privileges for that user on the unique class identifier device be terminated as soon as possible. Accordingly, the group policy service updates the ACLs stored in the registry for the device and restarts the device so that the ACLs will be applied quickly. It is understood, however, that the group policy service may apply changes more slowly in alternative embodiments.

As discussed above, group policies may be applied at machine level or at the user level. Where a group policy is applied at the machine level, the ACL for a given device 108 will determine what permissions all users who log onto the client terminal will have for that device. Alternatively, where a group policy is applied on a user level, then group policies for a given user may be stored in ACLs from access control entries, or ACE, which follow that user. When that user logs onto a client terminal, the user's ACE is added to the ACL for the various devices 108 on that client terminal. In embodiments, where group policy is set for both a client terminal, and a user on that device, the machine level group policy for the client terminal may take precedence. It is understood that user level policy may take precedence in alternative embodiments.

The ACLs for unique class identifier and/or removable storage devices 108 set as described above will govern requests by a client terminal I/O manager for access to devices 108 on a client terminal. Thus, for each class of device (identified by the device class identifier), the access rights of a user will be specified by the group policy. In embodiments, a user in a user group logged onto a given client terminal may be granted the following rights with respect to a device 108:

No Access—This will cause all access to the device 108 to be revoked for the selected user group. The user will not be able to read or write from the device. This setting could be chosen if the IT administrator does not want users to copy files to a client terminal (for example to avoid upload of malicious programs) or copy files to the device 108 (for example to avoid theft of sensitive information).

Read Only—This will allow read only access to the device 108. Users will be able to copy files from the device, but not copy to it.

Write Only—This will allow write only access to the device.

Read and Write—This will allow users to read from and write to the client terminal.

Access to unrestricted portion of a removable storage device.

Access to one or more restricted portions of a removable storage device.

Configuration rights—the types of configuration operations that are valid for the user to do to the device.

It is understood that other rights may be granted in further embodiments of the system, such as for example formatting rights, editing rights, etc.

In the above-described embodiments, permissions for the user of a device may be set for a device class by client terminal and/or user. In a further embodiment of the present system, permissions and group policy may be set for a specific device (as opposed to specific type of device), client terminal and/or user. In such embodiments, a unique identifier for each device may be identified and, in embodiments, associated with a specific user, or owner. Thereafter, the device owner may have permission to use that device on one or more client terminals, while others may be prevented from using that device on the one or more client terminals. Thus, if the device is stolen or if attempted use is made by an unauthorized device user, the unauthorized user may be prevented from using the device on a given client terminal, even if the user is otherwise authorized to use other devices of the same class on that client terminal. It is further contemplated that instead of a device having a single authorized owner, a group of users may be authorized for the device.

In order to set policy for a specific device, use is made of a device identifier associated with every manufactured device that is unique to that device. In embodiments, this unique device identifier may be a disk signature GUID. Unlike class identifiers, which are unique to a class of devices (with each device in the class having the same identifier), disk signature GUIDs are unique for each specific device. It is understood that a variety of other unique device identifiers, including for example certificate-based IDs, may be used in alternative embodiments to set group policy on a per-device level.

Figure 11:
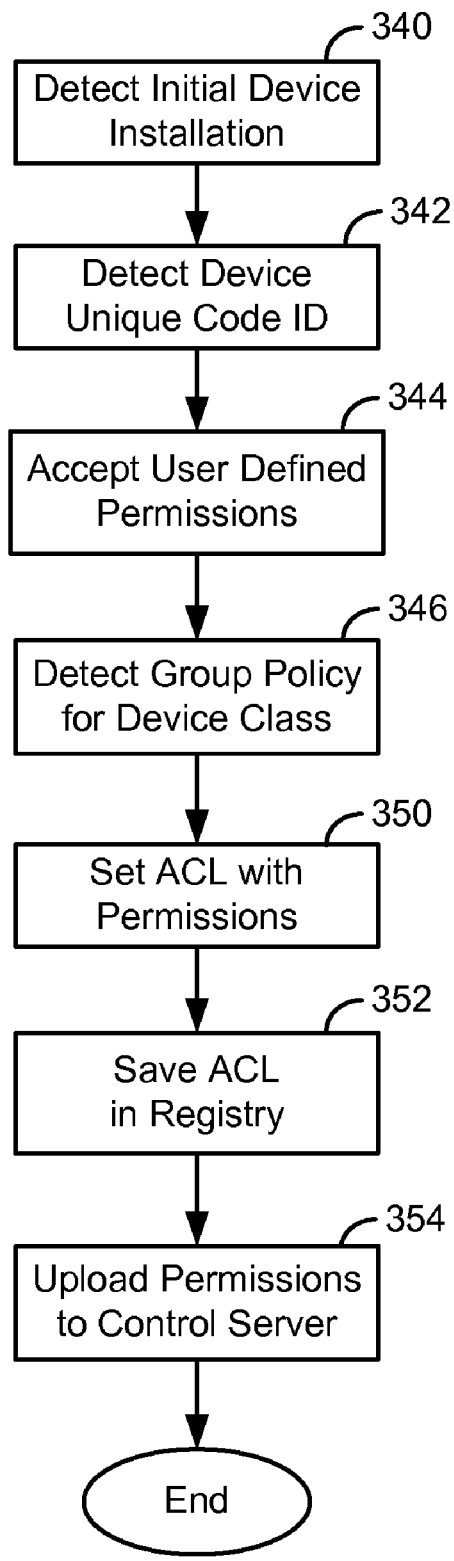
FIG. 11 is a flowchart for generating a user-defined group policy for a specific device based on a unique device identifier for that device according to an alternative embodiment.

Referring now to the flowchart of FIG. 11 in step 340, the operating system of a client terminal detects the initial installation of a device on the terminal. The device may be any device capable of being installed on client terminal 104 (including the above-described unique class identifier and removable storage devices 108). During installation of the device, the operating system detects the unique device identifier for the device in step 342. As explained above, in embodiments that may be a disk signature GUID, but it may be other unique device identifiers in alternative embodiments.

In step 344, the user may be presented with a user interface allowing the user to set user-defined group policy for the device. The interface may provide the user the option to make the device 100% private so that only the user can access the device. In such an embodiment, the operating system would then create a policy based on the then-logged in user and the unique device ID so that that device could only be used by the then-logged in user (who becomes the owner of that device). The user may alternatively specify different users or user groups to have permission to the use the device. The user may set policy as to which machines the device may be used on. The user may also set policy as to what rights (read or write) the specified users or groups have for the device on a client terminal. Thus, the user may specify that certain users have certain rights on certain client terminals.

In certain embodiments the above-described user-interface may be omitted, and a policy automatically generated for the specific device upon initial installation. That policy may for example limit use of the device only to the owner of the device, i.e., the user logged in upon initial installation of the device.

In certain embodiments, the user-defined policy can be a policy for the specific device which is more restrictive than a group policy that applies to the device class by virtue of the device class group policy explained above. In certain embodiments, the user-defined policy would not however be able to expand the group policy that applies to the device class for that device. For example, if the user-defined policy allowed user groups A, B and C to use the specific device on a given client terminal, but the group policy only allows access to groups A and B for the device class on the client terminal, group C would not be able to use the specific device on the client terminal. It is understood that the user policy may expand the group policy in alternative embodiments.

In step 246, group policy for the device is detected as described above upon installation of a device 108. Such a group policy may or may not exist for the device. In step 250, an ACL is set including both the user-defined policy for the specific device and the group policy, if any, which applies to the device by virtue of its device class. In step 252, the ACL may be saved to the client terminal registry or elsewhere. It is understood that the ACL may be saved with various protections to prevent tampering, including hashing and other security algorithms.

In step 354, the user-defined policy may be uploaded to the control server 102. Installation of the device may then be completed as described above. Once uploaded to the control server, an administrator may modify the user-defined policy. In embodiments, the administrator may only have rights to modify some or none of the policies defined by the user.

Figure 12:
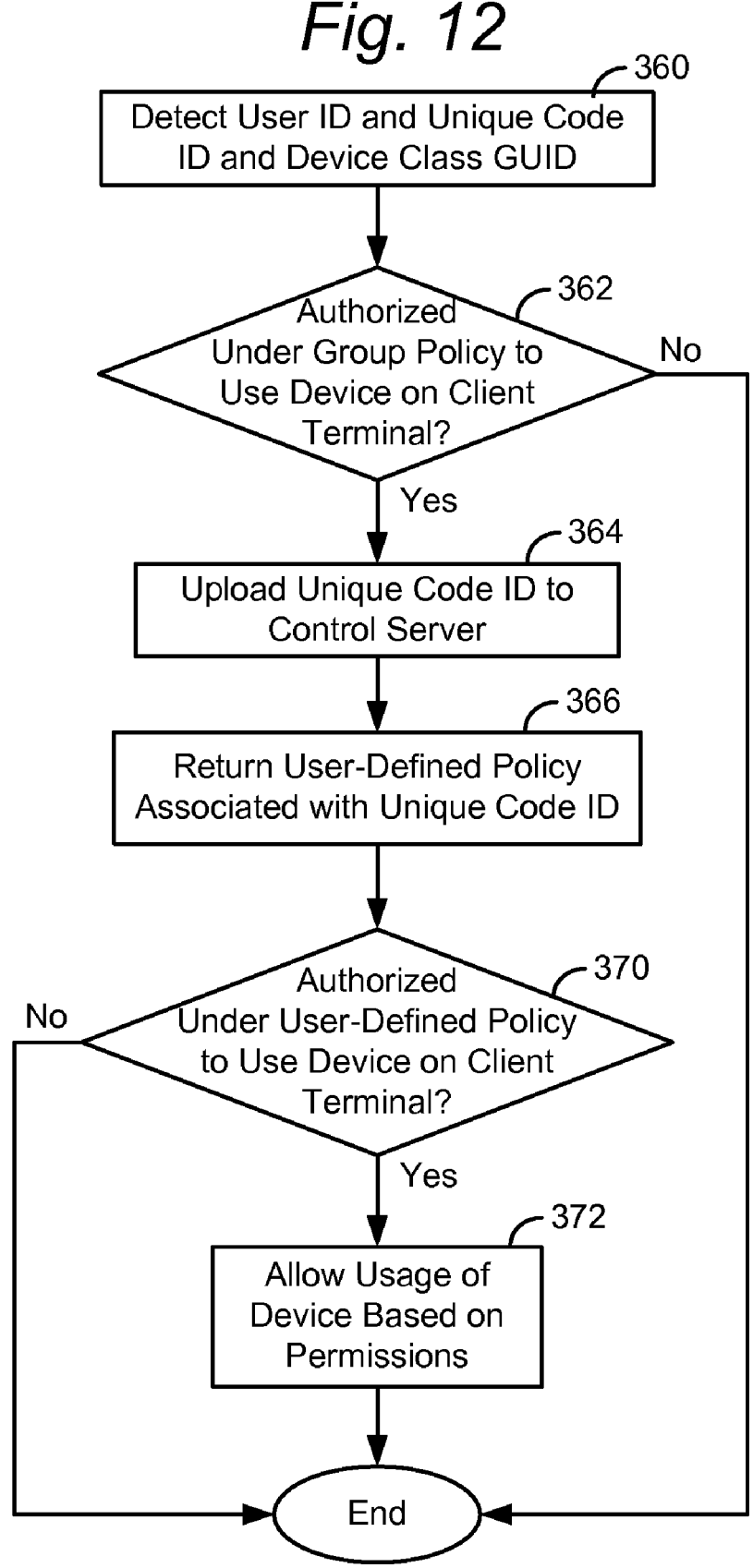
FIG. 12 is a flowchart for applying a user-defined group policy for a specific device and a group policy for a class of devices according to the embodiment of FIG. 11.

Referring now to FIG. 12, after the initial installation of the device, when the device is again used in the same or different client terminal, the user ID, the unique device ID for the specific device and the group policy for the device class may be detected in step 360. The client terminal operating system may check in step 362 whether the user and device are authorized on the client terminal based on the group policy stored on the client terminal as explained above. If the user is not authorized, the user is denied access to the device.

Assuming there is no group policy preventing the user from using the device on the client terminal, the unique device ID for the device may be passed to the server in a step 364. In step 366, any user-defined policy associated with the uploaded unique device ID is identified and returned to the client terminal in step 366. Based on the user-defined policy relayed back from the control server 102, the client device operating system determines in step 370 whether the user is authorized for the device on the client terminal. If not, the user is denied access to the device. Assuming the user is authorized to use the device on the client terminal, the user is granted access to the device in step 372. As discussed above, the degree to which the user may have access to the device may be specified in the group policy and/or the user-defined policy.

Figure 13:
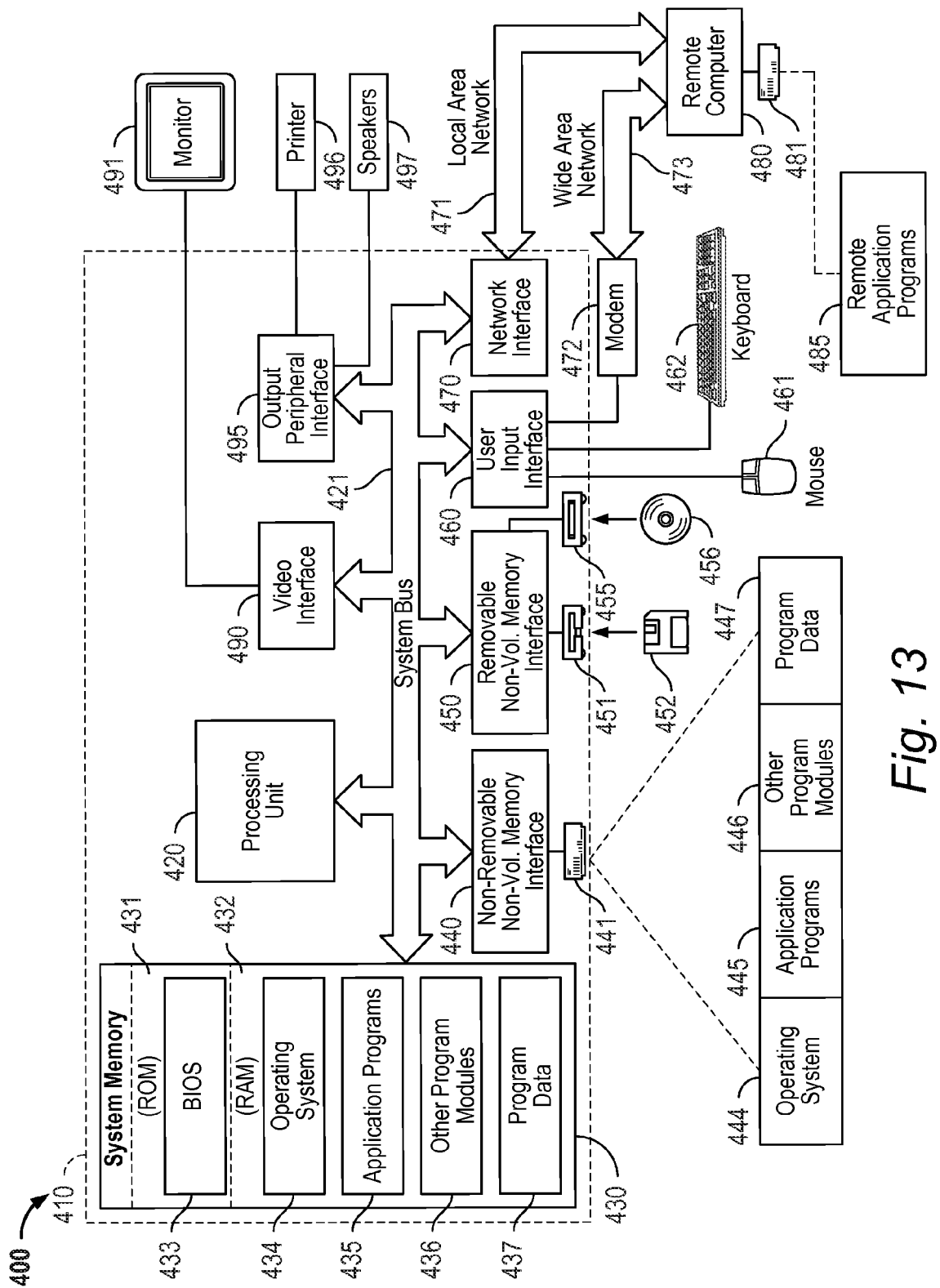
FIG. 13 illustrates a block diagram of an embodiment of a computing environment for implementing the present technology.

FIG. 13 illustrates an example of a suitable general computing system environment 400 that may comprise the control server 102 and/or a client terminal 104 on which the inventive system may be implemented. It is understood that the term "computer" as used herein broadly applies to any digital or computing device or system. The computing system environment 400 is only one example of a suitable computing environment and is not intended to suggest any limitation as to the scope of use or functionality of the inventive system. Neither should the computing system environment 400 be interpreted as having any dependency or requirement relating to any one or combination of components illustrated in the exemplary computing system environment 400.

The inventive system is operational with numerous other general purpose or special purpose computing systems, environments or configurations. Examples of well known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 13, an exemplary system for implementing the inventive system includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 may include a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 430 includes computer storage media in the form of volatile and/or nonvolatile memory such as ROM 431 and RAM 432. A basic input/output system (BIOS) 433, containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 13 illustrates operating system 434, application programs 435, other program modules 436, and program data 437.

The computer 410 may also include other removable/non-removable, volatile/nonvolatile computer storage media. By way of example only, FIG. 13 illustrates a hard disc drive 441 that reads from or writes to non-removable, nonvolatile magnetic media and a magnetic disc drive 451 that reads from or writes to a removable, nonvolatile magnetic disc 452. Computer 410 may further include an optical media reading device 455 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 441 is typically connected to the system bus 421 through a non-removable memory interface such as interface 440, magnetic disc drive 451 and optical media reading device 455 are typically connected to the system bus 421 by a removable memory interface, such as interface 450.

The drives and their associated computer storage media discussed above and illustrated in FIG. 13, provide storage of computer readable instructions, data structures, program modules and other data for the computer 410. In FIG. 13, for example, hard disc drive 441 is illustrated as storing operating system 444, application programs 445, other program modules 446, and program data 447. These components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and a pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 13. The logical connections depicted in FIG. 13 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communication over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 13 illustrates remote application programs 485 as residing on memory device 481. It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

I claim:

1. In a computing system comprising one or more client terminals, a method of applying group policy access permissions for a specific device used on the one or more client terminals, the method comprising the steps of:
   receiving, by a first client terminal of the one or more client terminals, a first group policy associated with the specific device, wherein the specific device is operatively connected to the first client terminal;
   receiving, by the first client terminal from the specific device, a device identifier unique to the specific device;
   transmitting, by the first client terminal, the first group policy associated with the unique device identifier to a server;
   receiving, by a second client terminal of the one or more client terminals, a request by a user to access the specific device, wherein the specific device is operatively connected to the second client terminal;

receiving, by the second client terminal from the server, the first group policy associated with the unique device identifier for the specific device;

determining, by the second client terminal, whether the first group policy associated with the unique device identifier permits access to the specific device by the user of the second client terminal; and when the first group policy associated with the unique device identifier permits access by the user to the specific device, allowing, by the second client terminal, the user to access the specific device.

2. The method as recited in claim 1, said step of receiving a first group policy associated with the unique device identifier for the specific device comprising receiving a user-defined policy relating to which users have access permissions for the specific device.

3. The method as recited in claim 1, said step of receiving a first group policy associated with the unique device identifier for the specific device comprising receiving a user-defined policy relating to each of the one or more client terminals on which the specific device may be used.

4. A computer-readable storage medium, wherein the medium does not consist of a propagated signal, the medium having computer-executable instructions for programming a processor on a client terminal to perform a method of configuring one or more group policies for one or more specific devices used on one or more client terminals, the method comprising the steps of:

(a) receiving, at the client terminal, a first device identifier unique to a first specific device, wherein the first specific device belongs to a first class of specific devices;

(b) receiving a second device identifier unique to a second specific device, wherein the second specific device belongs to the first class of specific devices;

(c) receiving, at the client terminal, a first group policy to apply to the first specific device, wherein the first group policy is associated with the first unique device identifier, and wherein the first group policy is more restrictive than a group policy applicable to the first class of specific devices to which the first specific device belongs;

(d) transmitting, by the client terminal, the first group policy associated with the unique device identifier to a server;

(e) retrieving, from the server, a second group policy of the one or more group policies to apply to the second specific device, wherein the second group policy is associated with the second unique device identifier, and wherein the second group policy is different from the first group policy;

(f) configuring, by the client terminal, access permissions for the first specific device based on the first group policy; and (g) configuring access permissions for the second specific device based on the second group policy.

5. The computer-readable storage medium as recited in claim 4, wherein the first group policy allows a first user to use the first specific device on the client terminal.

* * * * *